US007357260B2

(12) United States Patent
Kaeske

(10) Patent No.: US 7,357,260 B2
(45) Date of Patent: Apr. 15, 2008

(54) SOLID MATERIAL SEPARATOR

(75) Inventor: Egon Kaeske, Aachen (DE)

(73) Assignee: Durr Ecoclean GmbH, Filderstadt (DE)

( * ) Notice: Subject to any disclaimer, the term of this patent is extended or adjusted under 35 U.S.C. 154(b) by 0 days.

(21) Appl. No.: 10/968,627

(22) Filed: Oct. 19, 2004

(65) Prior Publication Data

US 2005/0189303 A1 Sep. 1, 2005

Related U.S. Application Data

(63) Continuation of application No. PCT/EP03/12193, filed on Nov. 3, 2003.

(30) Foreign Application Priority Data

Nov. 6, 2002 (DE) ................................ 102 51 570

(51) Int. Cl.
*B03C 1/00* (2006.01)
*B01D 35/00* (2006.01)

(52) U.S. Cl. ...................... 209/228; 209/232; 210/175; 210/180; 210/222

(58) Field of Classification Search .................. 209/11, 209/39, 223.1, 225, 228, 232; 210/175, 180, 210/222, 223, 695
See application file for complete search history.

(56) References Cited

U.S. PATENT DOCUMENTS

| | | | | |
|---|---|---|---|---|
| 3,487,939 | A * | 1/1970 | Keeley | 210/222 |
| 3,985,649 | A * | 10/1976 | Eddelman | 210/695 |
| 4,000,060 | A * | 12/1976 | Collin | 209/11 |
| 4,214,986 | A | 7/1980 | Watson et al. | |
| 4,686,049 | A | 8/1987 | Klobenzer et al. | |
| 5,837,144 | A | 11/1998 | Bienhaus et al. | |
| 6,579,454 | B2 | 6/2003 | Kaeske | |
| 6,764,859 | B1 * | 7/2004 | Kreuwel et al. | 436/178 |
| 2001/0007770 | A1 * | 7/2001 | Tajima | 436/47 |

FOREIGN PATENT DOCUMENTS

| | | | |
|---|---|---|---|
| BE | 481 512 | | 9/1948 |
| DE | 35 12 207 | A1 | 10/1986 |
| DE | 43 18 459 | C2 | 1/1994 |
| DE | 44 18 345 | A1 | 11/1995 |
| DE | 44 21 058 | A1 | 12/1995 |
| DE | 100 06 262 | A1 | 8/2001 |
| DE | 100 30 412 | A1 | 1/2002 |
| WO | WO 91/04101 | | 4/1991 |
| WO | WO 01/05510 | A1 | 1/2001 |

* cited by examiner

*Primary Examiner*—Joseph Rodriguez
(74) *Attorney, Agent, or Firm*—Leydig, Voit & Mayer, Ltd.

(57) ABSTRACT

A solid material separator for separating solid particles from a mixture containing liquid and these particles which enables the process of separating the solid particles from the liquid to be improved. The solid separator comprising a collecting vessel which is movable from a filling position, wherein the mixture containing the particles and the liquid is fed into the collecting vessel, to a liquid run-off position, wherein the liquid can at least partially drain out of the collecting vessel, and a device for producing a magnetic field by means of which the particles are at least partially retained in the collecting vessel in the liquid run-off position.

16 Claims, 4 Drawing Sheets

SOLID MATERIAL SEPARATOR

CROSS-REFERENCE TO RELATED PATENT APPLICATIONS

This application is a continuation application of PCT/EP2003/012193 filed Nov. 3, 2003, the entire specification of which is incorporated herein by reference.

FIELD OF THE INVENTION

The present invention relates to a solid material separator for separating solid particles from a mixture containing a liquid and these particles.

BACKGROUND OF THE INVENTION

Solid material separators are known in the art and are used, for example, for separating ferrite particles from a washing liquid containing the particles. In particular, such solid separators are known in the form of drum-type magnetic separators. In drum-type magnetic separators, the liquid containing the ferrite particles is fed into a container having a magnetic drum therein which is immersed in the liquid. Whilst the drum is rotating about its axis, the ferrite particles accumulate on the outer surface of the drum and are transported on said outer surface to a fixed scraper which is used to strip the particles off the outer surface of the magnetic drum.

A disadvantage of such drum-type magnetic separators is that liquid also adheres to the magnetic drum and is stripped off together with the ferrite particles by the scraper so that only partial separation of the particles from the liquid is achieved.

OBJECT OF THE INVENTION

An object of the present invention is to provide a solid separator which enables the process of separating the solid particles from the liquid to be improved.

BRIEF SUMMARY OF THE INVENTION

The invention provides a collecting vessel which is movable from a filling position, wherein the mixture containing the particles and the liquid is adapted to be fed into the collecting vessel, to a liquid run-off position, wherein the liquid can at least partially drain out of the collecting vessel, and a device for producing a magnetic field by means of which the particles are retained in the collecting vessel when it is in the liquid run-off position. The solid separator in accordance with the invention enables solid particles consisting of a magnetic or magnetizable material to be separated from the mixture containing the particles and a liquid in a particularly efficient manner without needing to use a filter device for this purpose.

The solid separator is also particularly suitable for the separation of extremely small particles from a liquid. Even in the case of particle sizes smaller than approximately 10 μm, it is possible to achieve separation of the solid particles from the liquid without the aid of filters.

The liquid in which the solid particles requiring separation are contained can be any type of liquid. For example, water, caustic solutions, emulsions, cooling lubricants or oils come into consideration.

The solid separator in accordance with the invention is especially suitable for processing liquids and slurries having ferrite constituents, as for example grey cast iron slurries, for processing washing liquids having a high particle content and for processing the concentrate from filter systems such as back-rinsing filters, ultra-filtration plants etc.

In a preferred embodiment of the invention, provision is made for the collecting vessel to be rotatable into the liquid run-off position from the filling position. In order to enable the separated solid matter to be discharged from the collecting vessel in a simple manner, the collecting vessel may also be moved from the liquid run-off position and/or from the filling position into a solid discharge position in which the separated solid matter is dischargeable from the collecting vessel.

In particular, provision may be made for the collecting vessel to be rotatable from the liquid run-off position and/or from the filling position into the solid discharge position.

A particularly simple method of emptying the collecting vessel is achieved if the separated solid matter is dischargeable from the collecting vessel in the solid discharge position by the effects of gravitational force. For receiving the solid matter from the collecting vessel, there is preferably provided a solid-holding container which is arranged below the collecting vessel.

The device for the production of the magnetic field can, in particular, comprise at least one fixed magnet element, i.e. one that does not move with the collecting vessel. Such a magnet element may be in the form of an electromagnet for example. In a preferred embodiment of the invention, however, provision is made for the at least one magnet element to be in the form of a permanent magnet element. The operational reliability of the solid separator is thereby increased.

In order to allow the magnetic field produced by the device for the production of the magnetic field to penetrate into the interior of the collecting vessel so that it is weakened as little as possible, provision is preferably made for the collecting vessel to be formed from a non-magnetic material. It is particularly useful if the collecting vessel is formed from a non-magnetic metallic material, for example, from a VA steel.

In order to enable the separated solid matter contained in the collecting vessel to be dried, provision is made in a preferred embodiment for the solid separator to comprise a heating device for heating the collecting vessel. Such a heating device can be fixed so that it does not move with the collecting vessel. In order to enable the collecting vessel to be heated in each operational phase of the solid separator, it is desirable for the collecting vessel to comprise at least one side wall which is adjacent to the heating device in each position of the collecting vessel. The heating device can be constructed in any suitable manner and may, for example, comprise an electrical resistance heating element. In a preferred embodiment of the invention, however, provision is made for the heating device to comprise a heat exchanger. In particular, the heating device may be a heat exchanger having vapour flowing therethrough.

To facilitate the drainage of the liquid from the collecting vessel, provision may be made for the collecting vessel to comprise a run-off wall and another wall located opposite the run-off wall, whereby, in the filling position of the collecting vessel, the average gradient of the run-off wall is less than that of the wall of the collecting vessel opposite said run-off wall. In order to prevent the liquid emerging from the collecting vessel from reaching an external wall of the collecting vessel, provision may be made for a gutter wall aligned transversely relative to the run-off wall to be arranged on an edge of the run-off wall of the collecting vessel.

The invention is further directed towards a liquid medium processing plant which comprises at least one solid separator in accordance with the invention and at least one vaporizing device for at least partially vaporizing the liquid that has drained out of the solid separator. Such a liquid medium processing plant enables the residual liquid that has been separated from the solid particles to be processed by the vaporization process. The condensate of the liquid medium that has been obtained from the vapour can be reused and be fed back into a liquid medium circulating system. In particular, a device for the reprocessing of aqueous, oil-containing or fat-containing cleaning solutions such as is described in DE 35 12 207 A1 can be used for the vaporizing device.

In order to at least partially recover the heat utilized for vaporizing the liquid that has drained out of the solid separator, it is advantageous if the solid separator comprises a heat exchanger and if the vapour from the vaporizing device is supplied at least partially to this heat exchanger. The heat exchanger can serve as a heating device for the collecting vessel of the solid separator so that the separated solids contained in the collecting vessel of the solid separator can be heated and dried by means of the heat recovered from the vapour.

Furthermore, in order to reduce the quantity of liquid which must be separated from the solid particles in the solid separator, provision can be made for the liquid medium processing plant to comprise at least one magnetic separator by means of which the concentration of the solid particles in the mixture supplied to the solid separator is increased. Such a magnetic separator can be constructed in the same manner as the magnetic separator described in DE 100 06 262 A1, for example.

These and other features and advantages of the invention will be apparent to those skilled in the art upon reading the following summary and detailed description and upon reference to the drawings

DETAILED DESCRIPTION OF THE INVENTION

Figure 1:
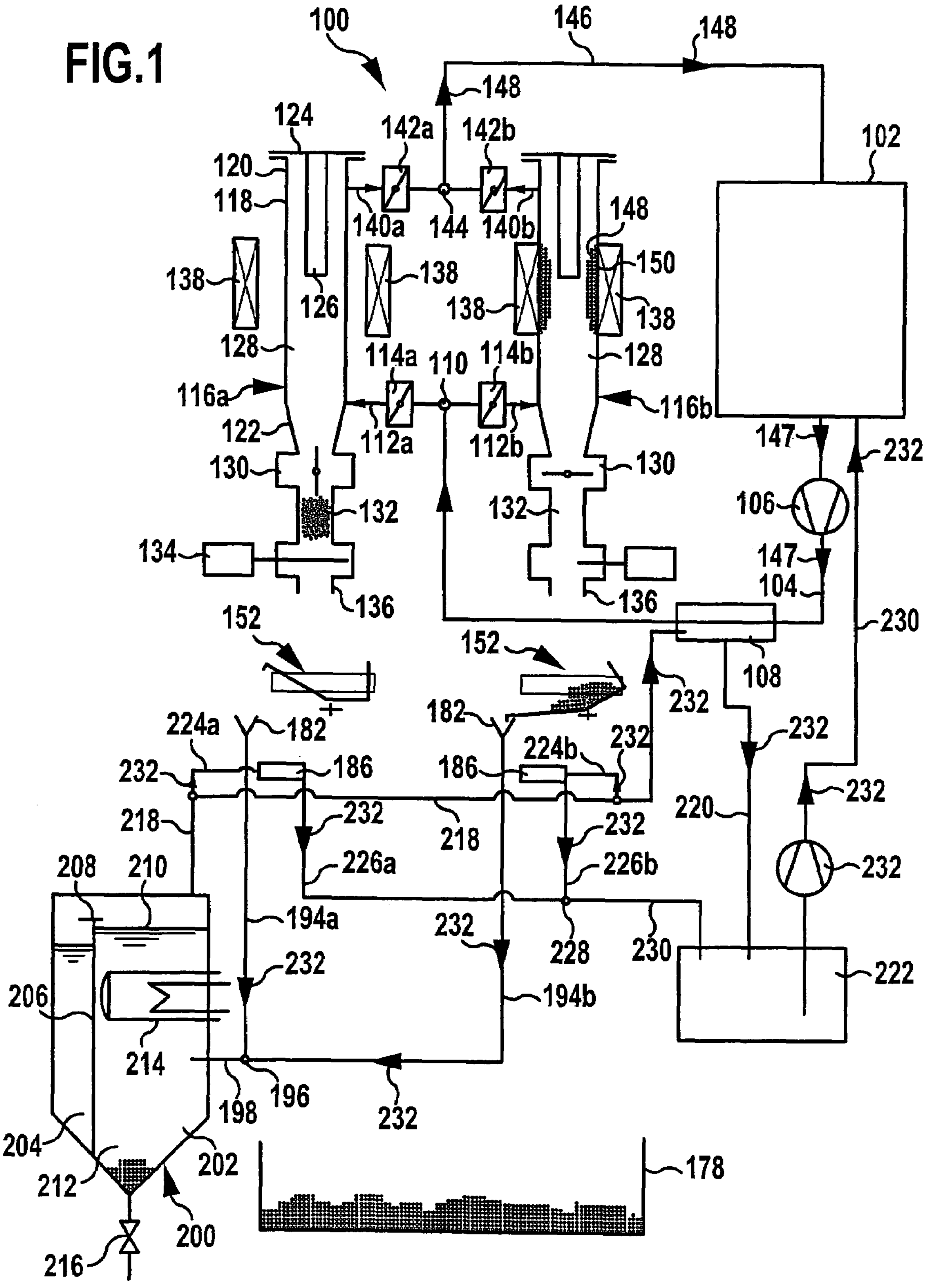
FIG. 1 is a schematic flow diagram of a liquid medium processing plant.

Turning now to the drawings, a liquid medium processing plant which is illustrated in FIG. 1 and bears the general reference 100 comprises a container 102 in which the liquid medium requiring processing, e.g. a washing liquid containing ferrite particles, is contained. A liquid supply line 104, in which a hydraulic pump 106 and a heat exchanger 108 are arranged, leads from the container 102 to a branching point 110. From the branching point 110, a first supply line 112*a* which is blockable by means of a non-return valve 114*a* leads to an inlet of a first magnetic separator 116*a*, whilst a second supply line 112*b* which is blockable by means of a non-return valve 114*b* leads to an inlet of a second magnetic separator 116*b*.

The first magnetic separator 116*a* comprises a base body 118 which itself comprises an upper cylindrical section 120 and a lower, downwardly tapering conical section 122. The upper end of the base body 118 is closed by a cover 124 from whose lower surface extends an inner pipe 126 that is coaxial with the upper section 120 of the base body 118 and protrudes into the interior of the base body 118 which forms a collecting chamber 128. A flap valve 130 is arranged at the lower end of the base body 118. A sluice chamber 132 that is arranged below the flap valve 130 is separable from the collecting chamber 128 by means of said flap valve. A slide valve 134 is arranged at the lower end of the sluice chamber 132 and an outlet pipe 136 is arranged below the slide valve 134 being separable from the sluice chamber 132 by means of said slide valve.

Furthermore, the first magnetic separator 116*a* comprises a plurality of magnet elements 138 that are adapted to be moved from a rest position which is illustrated in FIG. 1 wherein the magnet elements 138 are spaced from the base body 118, into a working position wherein the magnet elements 138 rest against the base body 118 of the magnetic separator. This is illustrated in FIG. 1 with the aid of the second magnetic separator 116*b*. The base body 118 may be formed from a non-magnetic metallic material, e.g. a VA steel, so that the magnetic field produced by the magnet elements 138 extends into the collecting chamber 128 when the magnet elements 138 are in the working position.

In the upper section 120 of the base body 118 of the first magnetic separator 116*a* there is provided an outlet from which a first removal line 140*a*, which is blockable by means of a non-return valve 142*a*, leads to a junction point 144. The second magnetic separator 116*b* is constructed in exactly the same way as the previously described first magnetic separator 116*a* and it comprises an outlet that is connected via a second removal line 140*b*, which is blockable by means of a non-return valve 142*b*, to the junction point 144. Thus, the two magnetic separators 116*a*, 116*b* are connected in parallel and the liquid medium requiring processing flows through them alternately from the container 102 when the liquid medium processing plant 100 is in operation.

As illustrated in FIG. 1, the non-return valves 114*a* and 142*a* are closed whereas the non-return valves 114*b* and 142*b* are open so that the liquid medium being pumped out of the container 102 by the hydraulic pump 106 flows back into the container 102 via the heat exchanger 108 and the collecting chamber 128 of the second magnetic separator 116*b* and from there via the junction point 144 and a liquid return line 146. The direction of flow of the liquid medium is indicated in FIG. 1 by the arrows 147.

In FIG. 1, the second magnetic separator 116*b* is in a collecting phase wherein the magnet elements 138 are arranged in their working position on the base body 118 so that the ferrite particles contained in the liquid medium flowing through the collecting chamber 128 are retained within a collecting region 148 which is surrounded by the magnet elements 138. The collecting phase of the second magnetic separator 116*b* is terminated when the volume of the particle slurry 150 that has collected in the collecting region 148 of the second magnetic separator 116*b* is such that it almost corresponds to the internal volume of the sluice chamber 132.

The non-return valves 114*b* and 142*b* are closed and the non-return valves 114*a* and 142*a* are opened so that the liquid medium now flows out of the container 102 through the first magnetic separator 116*a*. Thus, the first magnetic separator 116*a* enters its collecting phase wherein the magnet elements 138 are in their working position on the base body 118. Meanwhile, the second magnetic separator 116*b* enters into a sedimentation phase wherein the magnet elements 138 are moved from their working position into their rest position where they no longer retain the ferrite particles in the collecting region 148. Then the flap valve 130 is opened whereby air cushions present at the upper end of the collecting chamber 128 decay and a pulse-like movement is triggered in the fluid column located below the air cushions so that the ferrite particles are thereby expelled substantially in their entirety from the collecting region 148 within the interior of the base body 118. The displaced particles sink downwardly through the collecting chamber 128 due to the effects of the force of gravity and enter the sluice chamber 132 through the opened flap valve 130, the lower end of said chamber being closed by the slide valve 134.

The sedimentation phase of the second magnetic separator 116*b* is terminated by the closure of the flap valve 130 as soon as substantially all of the particle slurry 150 that was displaced from the collecting region 148 has entered the sluice chamber 132. In the following delivery phase of the second magnetic separator 116*b*, the slide valve 134 is opened so that the particles that are contained in the sluice chamber 132 and the residual liquid from the collecting chamber 128 will fall downwardly through the outlet pipe 136.

When the first magnetic separator 116*a* has terminated its collecting phase, the second magnetic separator 116*b* is switched back into its collecting phase and a new operational cycle of the second magnetic separator 116*b* begins.

Under each of the magnetic separators 116*a*, 116*b*, there is arranged a respective solid separator 152 which serves for separating the particles arriving via the outlet pipe 136 from the accompanying liquid. This process will be described in more detail hereinafter with reference to FIGS. 2 to 7.

Each solid separator 152 comprises a collecting vessel 154 which consists of two substantially flat, mutually parallel side walls 158 which are spaced from one another along a rotational axis 156 of the collecting vessel 154 and are constructed so as to be substantially congruent to each other. The two side walls 158 are connected together by means of a bottom wall 160 which is aligned substantially radially relative to the axis of rotation 156, a front wall 162 which extends from a radially outer end of the bottom wall 160 and is substantially perpendicular to the bottom wall 160, a rearward run-off wall 164 which extends from the radially inner end of the bottom wall 160 and includes an obtuse angle a with the upper surface of the bottom wall 160, and a gutter wall 166 which adjoins the outer end of the run-off wall 164 that is remote from the bottom wall 160 and extends substantially perpendicularly downwards from the run-off wall 164. The bottom wall 160, the front wall 162, the run-off wall 164 and the gutter wall 166 together with the regions of the side walls 158 connecting the front wall 162 to the run-off wall 164 form a collecting tank 168 which incorporates a passage opening 170 at the side thereof located above the bottom wall 160, said opening being bounded by the top edges of the front wall 162 and the run-off wall 164 and by the two side walls 158.

Figure 3:
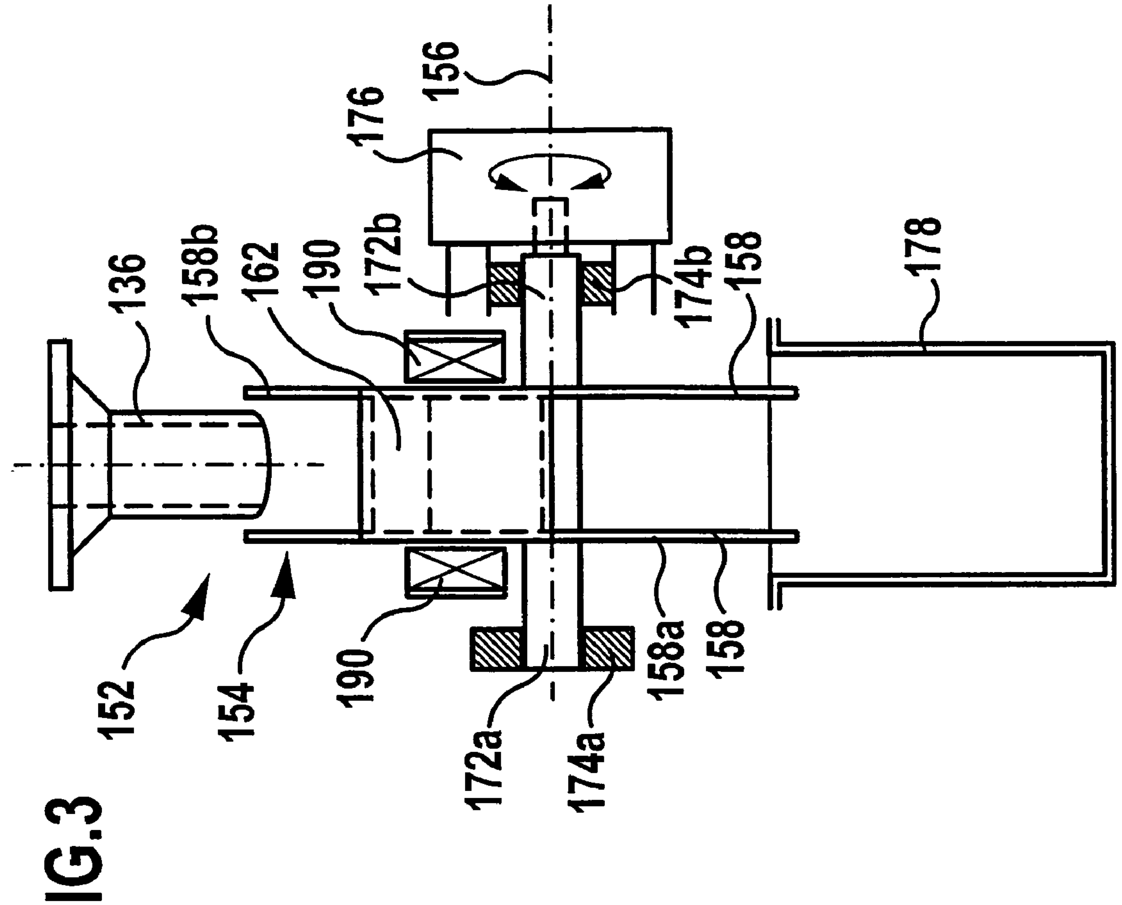
FIG. 3 is a front view of the solid separator depicted in FIG. 2 in the filling position as seen in the direction of the arrow 3 in FIG. 2.

As can best be seen from FIG. 3, there extends outwardly along the axis of rotation 156 from the outer surface of the side wall 158*a* illustrated on the left in FIG. 3 a first rotary shaft part 172*a* which is mounted in a (merely schematically illustrated) first bearing 174*a* such as to be rotatable about the axis of rotation 156. Similarly, there extends outwardly along the axis of rotation 156 from the outer surface of the side wall 158*b* illustrated on the right in FIG. 3 a second rotary shaft part 172*b* which is mounted in a second bearing 174*b* such as to be rotatable about the axis of rotation 156. The outer end of the second rotary shaft part 172*b* is engaged by a rotary drive device 176 with the aid of which the rotary shaft part 172*b* and hence the further elements of the collecting vessel 154 that are rigidly connected to the rotary shaft part 172*b* are rotatable about the axis of rotation 156.

A fixed (upwardly open) solid-holding container 178 is arranged below the collecting vessel 154. A collecting funnel 182 (partially illustrated in FIGS. 2, 4 and 6) for the liquid draining out of the collecting tank 178 is arranged at the top edge of a rear wall 180 of the solid-holding container 178. At an upper end of the collecting funnel 182, there is a stop member 184 which is arranged between the side walls 158 of the collecting vessel 154 and serves to limit the rotational path of the collecting vessel 154. The stop member 184 may consist of a resilient material in order to absorb the impact of the collecting vessel 154 on the stop member 184.

Furthermore, the solid separator 152 incorporates a heating device 186 which is arranged statically between the side walls 158 of the collecting vessel 154 and comprises two lateral heating surfaces 188 that are in contact respectively with the inner surface of the neighbouring side wall 158 of the collecting vessel 154, and an upper heating surface 189 that is in contact with the outer surface of the run-off wall 164 in the liquid run-off position of the collecting vessel 154. Heat can be transferred from the heating device 186 to the side walls 158 (which are rotatable relative to the heating device 186) via these heating surfaces 188. In the exemplary embodiment described here, the heating device 186 is in the form of a heat exchanger having vapour flowing therethrough.

Figure 5:
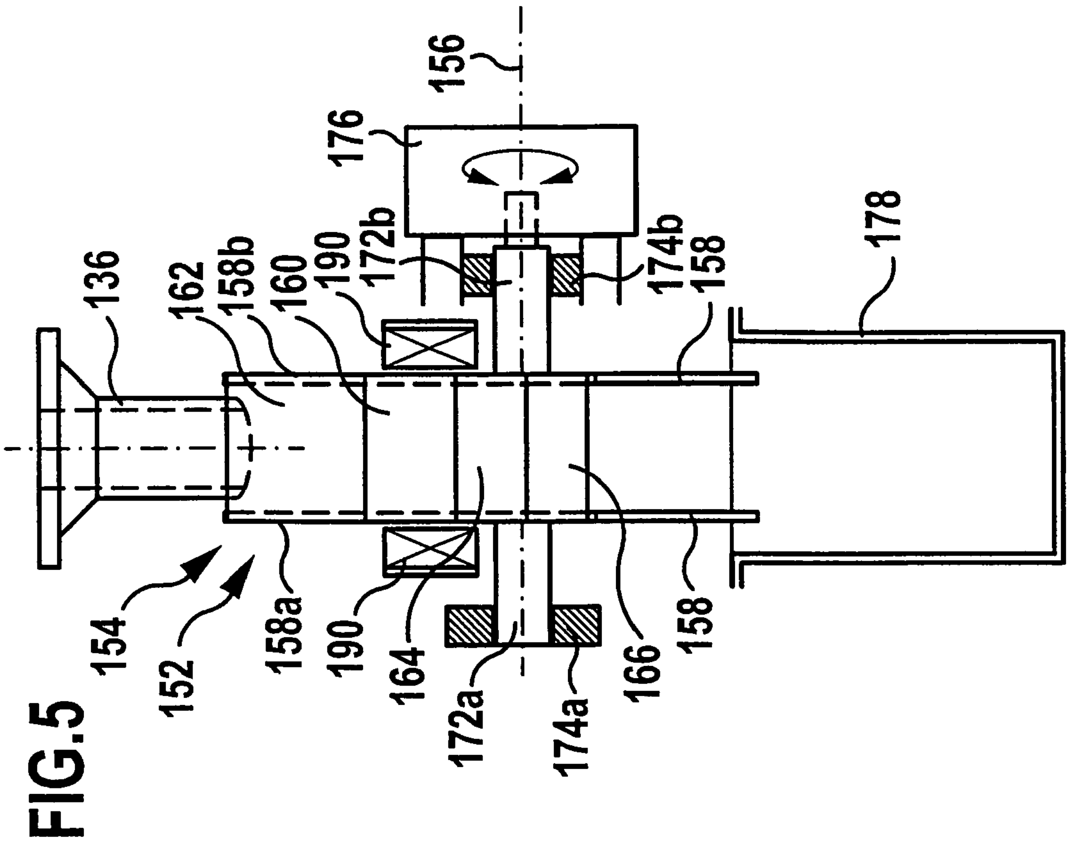
FIG. 5 is a front view of the solid separator depicted in FIG. 4 in the liquid run-off position as seen in the direction of the arrow 5 in FIG. 4.
Figure 4:
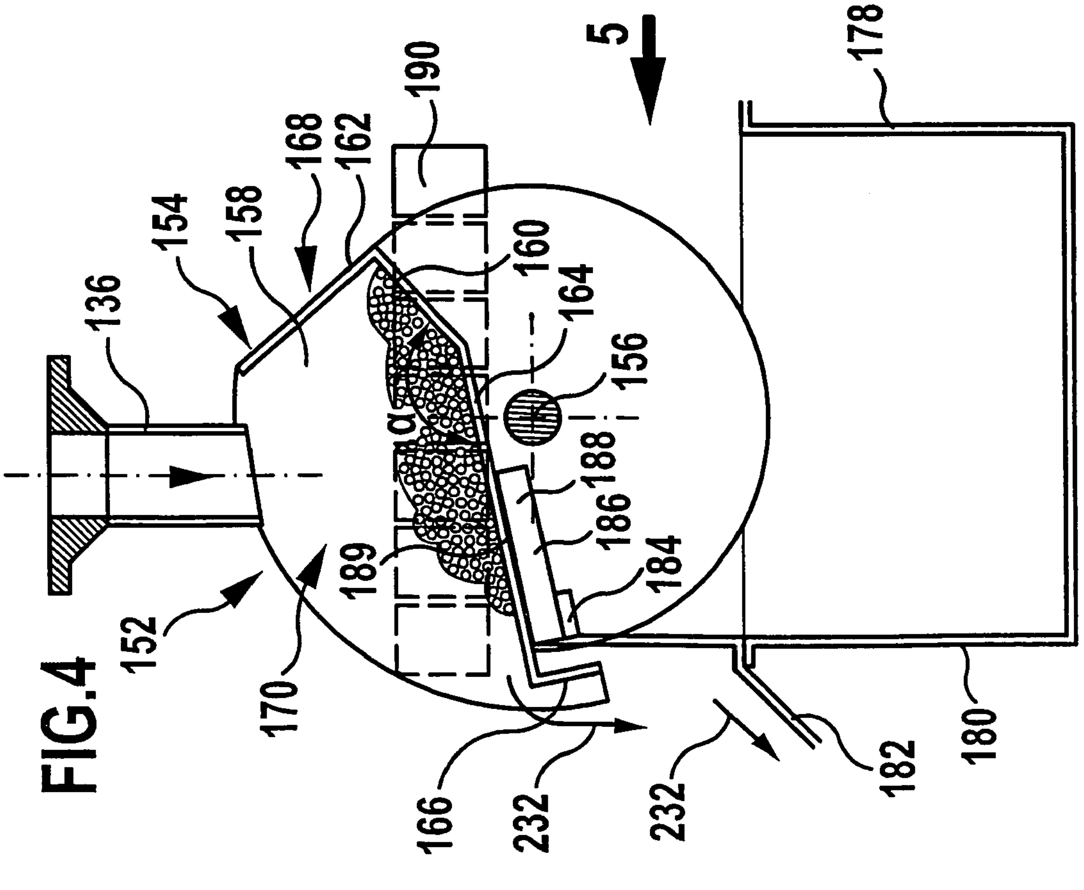
FIG. 4 is a side view of the solid separator depicted in FIG. 2 in the liquid run-off position.
Figure 7:
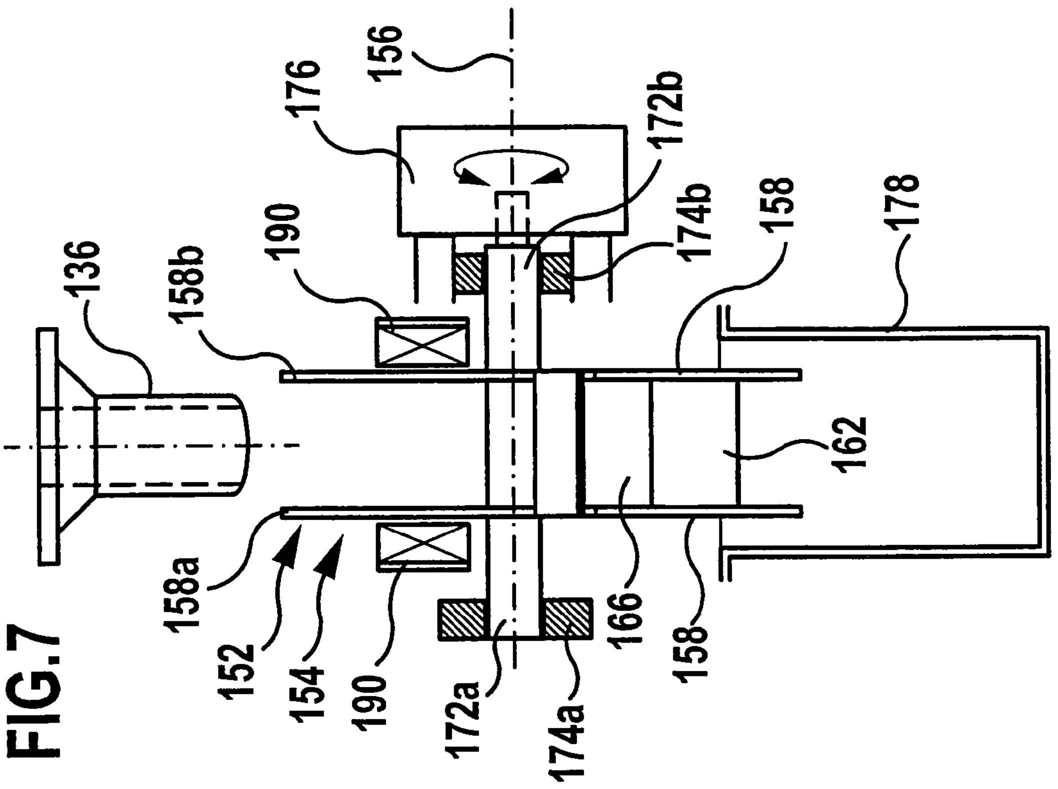
FIG. 7 is a side view of the solid separator depicted in FIG. 6 in the solid discharge position as seen in the direction of the arrow 7 in FIG. 6.
Figure 6:
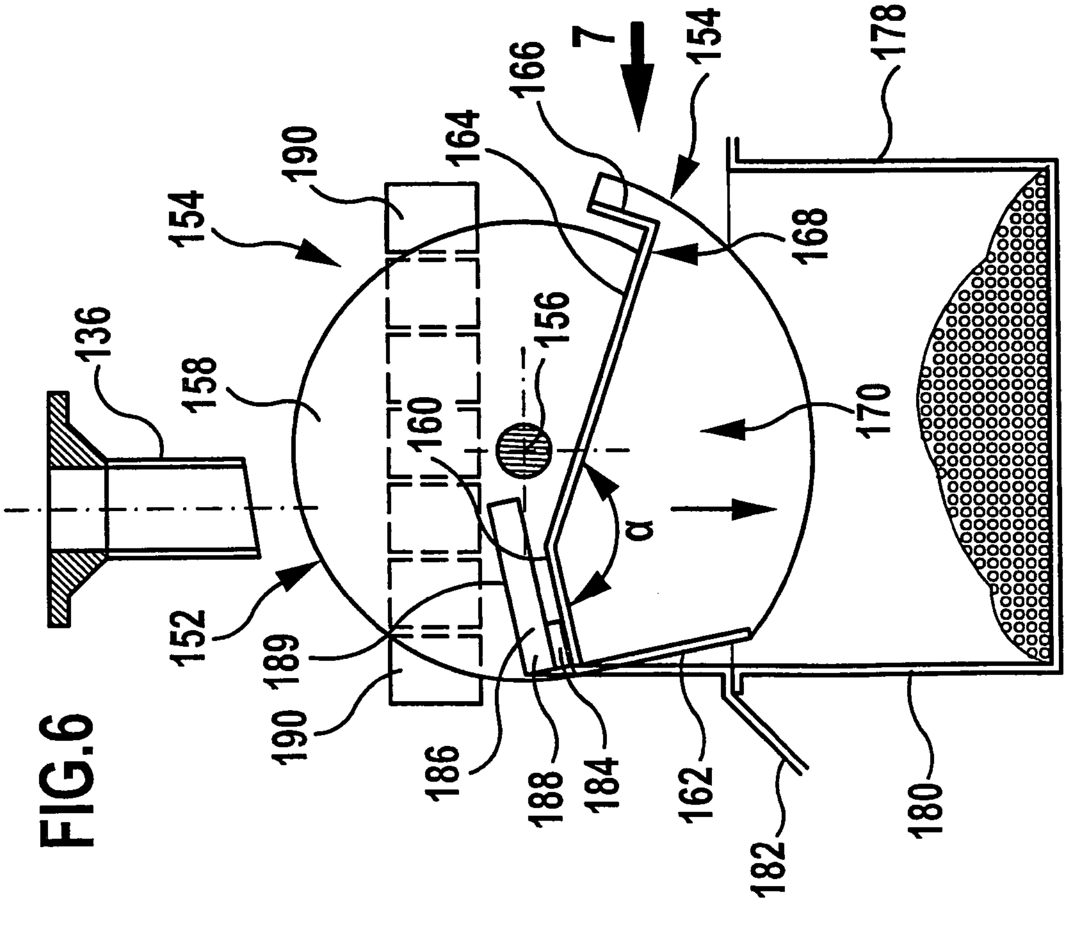
FIG. 6 is a side view of the solid separator depicted in FIGS. 2 and 4 in the solid discharge position.

The solid separator 152 comprises a plurality of magnet elements 190 that are arranged in two substantially horizontal rows extending above the axis of rotation 156 of the collecting vessel 154 at both sides of the collecting vessel 154 and adjacent to the outer surfaces of the side walls 158. The collecting vessel 154 consists of a non-magnetic metallic material, e.g. a VA steel, so that the magnetic field produced by the magnet elements 190 extends into the space formed between the side walls 158 of the collecting vessel 154. The magnet elements 190 may be in the form of permanent magnets. The collecting vessel 154 can be moved into three different working positions by means of the rotary drive device 176, namely, a filling position which is illustrated in FIGS. 2 and 3, a liquid run-off position which is illustrated in FIGS. 4 and 5 and a solid discharge position which is illustrated in FIGS. 6 and 7.

Figure 2:
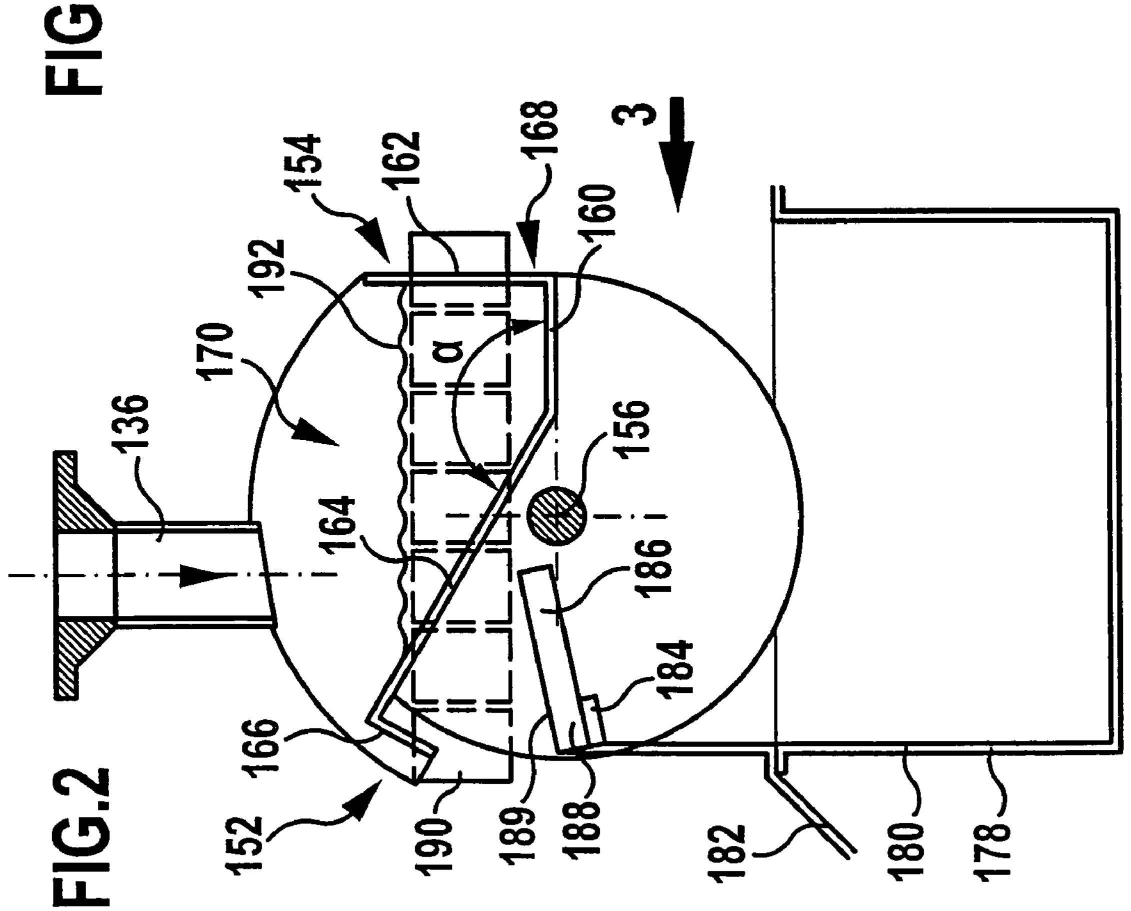
FIG. 2 is a schematic side view of a solid separator in the liquid medium processing plant depicted in FIG. 1 in the filling position of the solid separator.

In the filling position illustrated in FIGS. 2 and 3, the collecting vessel 154 is aligned in such a way that the bottom wall 160 of the collecting tank 168 is aligned substantially horizontally and the longitudinal axis of the outlet pipe 136 that is arranged above the solid separator 152. Emanates from the respective magnetic separators 116*a* and 116*b* associated with the solid separator 152 are directed between the side walls 158 of the collecting vessel 154 toward the passage opening 170 of the collecting tank 168. The collecting vessel 154 is moved into the filling position before the slide valve 134 of the respective magnetic separator 116*a* or 116*b* arranged above the solid separator 152 is opened. After the opening of the slide valve 134, the particles that are contained in the sluice chamber 132 of the relevant magnetic separator as well as the liquid that is contained in the sluice chamber 132 both enter the collecting tank 168 via the outlet pipe 136.

The collecting vessel 154 remains in the filling position for several delivery phases of the associated magnetic separator, namely, until the filling level 192 of the collecting tank 168 has almost reached the top edge of the front wall 162 or that of the run-off wall 164. The ferrite particles that are filled into the collecting tank 168 during this filling phase adhere to the side walls of the collecting tank 168 due to the effect of the magnetic field produced by the magnet elements 190. When the maximum filling level of the collecting tank 168 has been reached, the collecting vessel 154 is rotated slowly counter clockwise (as viewed in FIG. 2) by means of the rotary drive device 176 from the filling position into the liquid run-off position illustrated in FIGS. 4 and 5. The run-off wall 164 of the collecting tank 168 rests against the upper heating surface 189 of the heating device 186 and is thus inclined to the horizontal in such a way that the radially outer edge thereof lies below the edge of the run-off wall 164 adjoining the bottom wall 160 so that, in this position, the gradient of the run-off wall 164 slopes toward the gutter wall 166. In this liquid run-off position, the liquid contained in the collecting tank 168 therefore flows out of the collecting tank 168 and into the collecting funnel 182 over the run-off wall 164 and the gutter wall 166.

Due to the effect, however, of the magnetic field which is produced by the magnet elements 190, the ferrite particles contained in the collecting tank 168 are retained on the side walls 158 of the collecting tank 168 even in the liquid run-off position so that they do not enter the collecting funnel 182. After substantially all of the liquid has drained out of the collecting tank 168, the collecting vessel 154 is heated by means of the heating device 186 so that the solids remaining in the collecting tank 168 are dried.

After the passage of a given period of time in the liquid run-off position that is sufficient for the desired process of drying the solids in the collecting tank 168, the collecting vessel is moved in the clockwise direction (as viewed in FIG. 4) by means of the rotary drive device 176 from the liquid run-off position into the solid discharge position illustrated in FIGS. 6 and 7. The base of the bottom wall 160 of the collecting tank 168 rests on the stop member 184 and the passage opening 170 of the collecting tank 168 is directed downwardly so that the solid particles enter the solid-holding container 178 from the collecting tank 168 through the passage opening 170 under the effects of the force of gravity. In the solid discharge position, the entire collecting tank 168 is below the axis of rotation 156 of the collecting vessel 154 where there are no magnet elements 190 so that the ferrite particles are not retained on the side walls of the collecting tank 168 by a magnetic field in the solid discharge position.

Following the process of substantially completely emptying the collecting tank 168, the collecting vessel 154 is rotated back into the previously described filling position in a counter-clockwise direction (as viewed in FIG. 2) by means of the rotary drive device 176 in order to receive fresh solid particles and liquid. As can be seen from FIG. 1, the collecting funnels 182 associated with the solid separators 152 are each connected via a liquid removal line 194*a*, 194*b* to a junction point 196, from where a supply line 198 leads to an inlet of an evaporator 200. The supply line flows into a boiling zone 202 of the evaporator 200 which is separated from an oil collecting area 204 of the evaporator by a partition 206 having an overflow 208. The boiling zone 202 is filled with a liquid bath 212 up to a bath level 210, a heating device 214 being immersed in said bath for heating the liquid in the liquid bath 212 to beyond its boiling point.

The non-magnetic solid particles which were not retained in the collecting vessels 154 and which entered the boiling zone 202 of the evaporator 200 with the liquid drained from the solid separators 152 settle on the bottom of the boiling zone 202 and can be removed therefrom via a valve 216. Oily constituents of the liquid emerging from the solid separators 152 form an oil film on the top surface of the liquid bath 212 due to their smaller specific weight, and from there, this oily phase enters the oil collecting area 204 of the evaporator 200 over the overflow 208.

The vapour of the liquid requiring processing that was formed by vaporizing the liquid in the liquid bath 212 enters a vapour removal line 218 via an outlet located in the top surface of the evaporator 200. Said vapour then enters the vapour side of the heat exchanger 108 wherein the heat of the vapour is transferred to the liquid medium being pumped from the container 102 and the vapour thereby condenses. The condensate from the heat exchanger 108 is fed into a condensate collecting vessel 222 via a condensate line 220. Vapour branching lines 224*a*, 224*b* branch off the vapour removal line 218 so that the vapour can be supplied via said branching lines from the vapour removal line 218 to the heating devices 186 of the collecting vessel 154 which are in the form of heat exchangers.

In the heating devices 186, the heat of the vapour is transferred to the collecting vessels 154 of the solid separators 152 for the purposes of drying the solids in the collecting tubs 168 and the vapour thereby condenses. The condensate reaches a junction point 228 via the condensate removal lines 226*a*, 226*b*, and from there, a condensate line 230 leads to the condensate collecting vessel 222. The condensate is transferred from the condensate collecting vessel 222 to the container 102 via a condensate return line 230 having a condensate pump 232 arranged therein. Thus, a liquid medium requiring purification is continuously extracted from the container 102 and the purified liquid medium is returned thereto via the fluid return line 146 whilst the reprocessed condensate from the distillation process is also returned thereto from the condensate collecting vessel 222 via the condensate return line 230. It is in this manner that the liquid medium in the container 102 is continuously cleaned and reprocessed. The directions of flow of the liquid draining from the solid separators 152, of the vapour escaping from the evaporator 200 and of the condensate being fed back from the heat exchangers 108, 186 are indicated by the arrow 232 in FIG. 1.

It will be appreciated by those of skill in the art that the particular design of the solid material separator may be of an alternate configuration than those disclosed in the illustrations herein. While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims. For example, various aspects of the invention may be practiced simultaneously.

All of the references cited herein, including patents, patent applications, and publications, are hereby incorporated in their entireties by reference.

I claim:

1. A solid separator for separating solid particles from a mixture containing the particles and a liquid, the solid separator comprising:

a collecting vessel adapted to receive at a filling position the mixture containing the particles and the liquid, wherein the liquid does not drain out of the collecting vessel at the filling position, the collecting vessel having an impermeable bottom wall, being mounted in at least one bearing such as to be rotatable about an axis of rotation, and being rotatable from the filling position to a liquid run-off position where the liquid is able to be at least partially drained out of the collecting vessel, and wherein the collecting vessel is adapted to be moveable from at least one of the liquid run-off position and the filling position to a solid discharge position;

a device for producing a magnetic field to at least partially retain the particles in the collecting vessel at the liquid run-off position; and a solid-holding container disposed below the collecting vessel for receiving the solid matter discharged from the collecting vessel.

2. The solid separator of claim 1, wherein the collecting vessel is rotatable from at least one of the liquid run-off position and the filling position into the solid discharge position.

3. The solid separator of claim 1, wherein separated solid matter is dischargeable from the collecting vessel at the solid discharge position by the effects of gravitational force.

4. The solid separator of claim 1, wherein the device for producing a magnetic field comprises at least one fixed magnet element.

5. The solid separator of claim 1, wherein the device for producing the magnetic field comprises at least one permanent magnet element.

6. The solid separator of claim 1, wherein the collecting vessel is formed from a non-magnetic material.

7. The solid separator of claim 1, further comprising a heating device for heating the collecting vessel.

8. The solid separator of claim 7, wherein the heating device is fixed.

9. The solid separator of claim 7, wherein the collecting vessel comprises at least one side wall which is adjacent to the heating device in each position of the collecting vessel.

10. The solid separator of claim 7, wherein the heating device comprises a heat exchanger.

11. A liquid medium processing plant, comprising:

at least one solid separator with a collecting vessel adapted to receive at a filling position a liquid medium containing solid particles and a liquid, the collecting vessel being movable from the filling position to a liquid run-off position where the liquid is able to be at least partially drained out of the collecting vessel;

a device for producing a magnetic field to at least partially retain the particles in the collecting vessel at the liquid run-off position; and at least one vaporizing device for at least partially vaporizing the liquid that has drained out of the solid separator.

12. The liquid medium processing plant of claim 11, wherein the solid separator comprises a heat exchanger and vapour from the vaporizing device is supplied at least partially to the heat exchanger.

13. The liquid medium processing plant of claim 11 further comprising at least one magnetic separator to increase the concentration of solid particles in the liquid medium being processed.

14. A solid separator for separating solid particles from a mixture containing the particles and a liquid, the solid separator comprising:

a collecting vessel adapted to receive at a filling position the mixture containing the particles and the liquid, the collecting vessel being movable from the filling position to a liquid run-off position where the liquid is able to be at least partially drained out of the collecting vessel, a heating device for heating the collecting vessel, wherein the heating device comprises a heat exchanger comprising a vapour flowing therethrough; and a device for producing a magnetic field to at least partially retain the particles in the collecting vessel at the liquid run-off position.

15. A solid separator for separating solid particles from a mixture containing the particles and a liquid, the solid separator comprising:

a collecting vessel adapted to receive at a filling position the mixture containing the particles and the liquid, the collecting vessel being movable from the filling position to a liquid run-off position where the liquid is able to be at least partially drained out of the collecting vessel, the collection vessel further comprising:

a run-off wall along which the liquid drains out of the collecting vessel in the liquid run-off position; and a wall disposed opposite the run-off wall, whereby, in the filling position of the collecting vessel, an average gradient of the run-off wall is less than an average gradient of the wall opposite the run-off wall; and a device for producing a magnetic field to at least partially retain the particles in the collecting vessel at the liquid run-off position.

16. The solid separator of claim 15, further comprising a gutter wall aligned transversely relative to the run-off wall and arranged on an edge of the run-off wall.

* * * * *